Dec. 26, 1950  J. H. LEWIS ET AL  2,535,942
ELECTRIC DIRECTION FINDING EVALUATOR
Filed Nov. 18, 1948  2 Sheets-Sheet 1
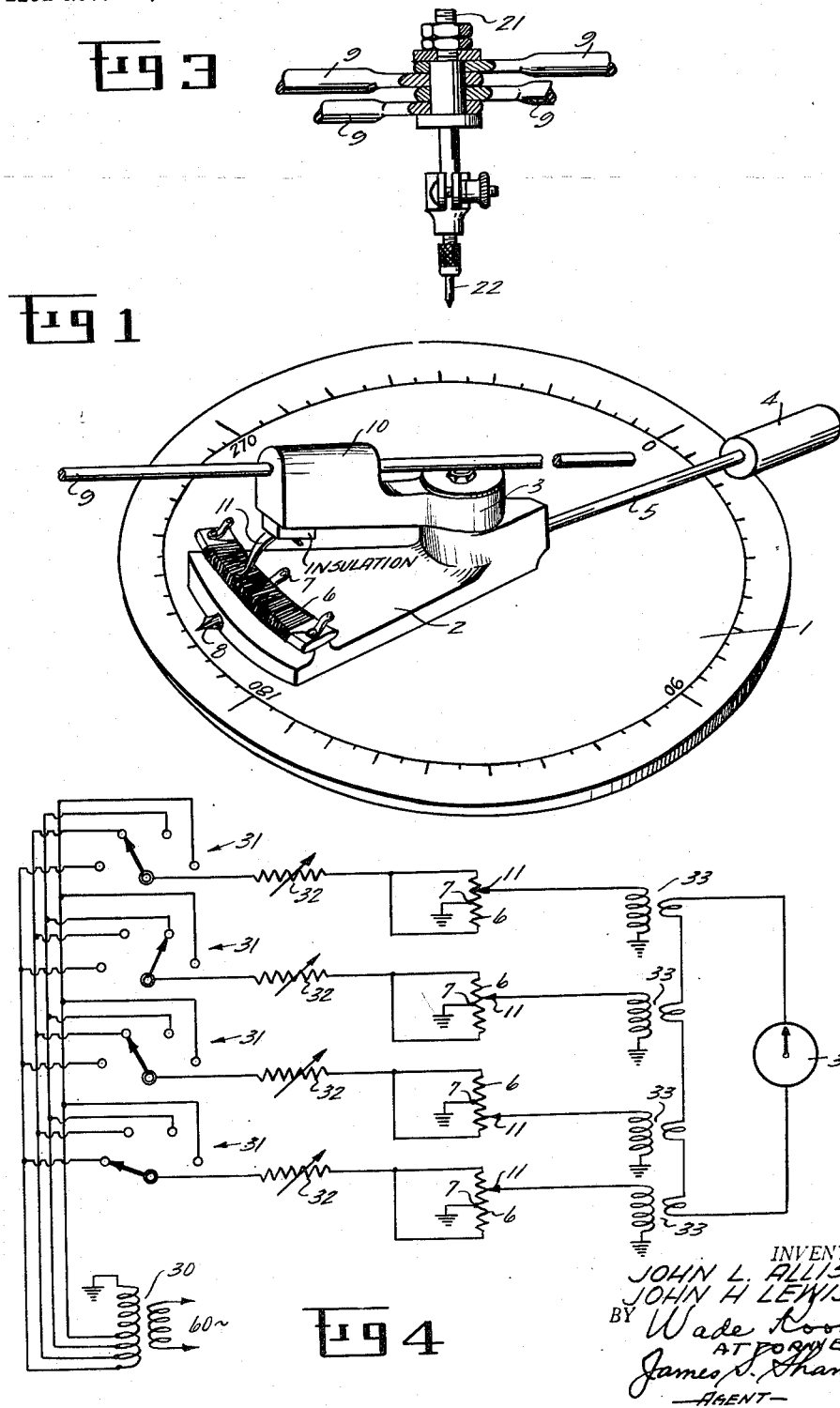
INVENTORS.
JOHN L. ALLISON
JOHN H. LEWIS
BY Wade Roouty
ATTORNEY
James D. Shannon
AGENT

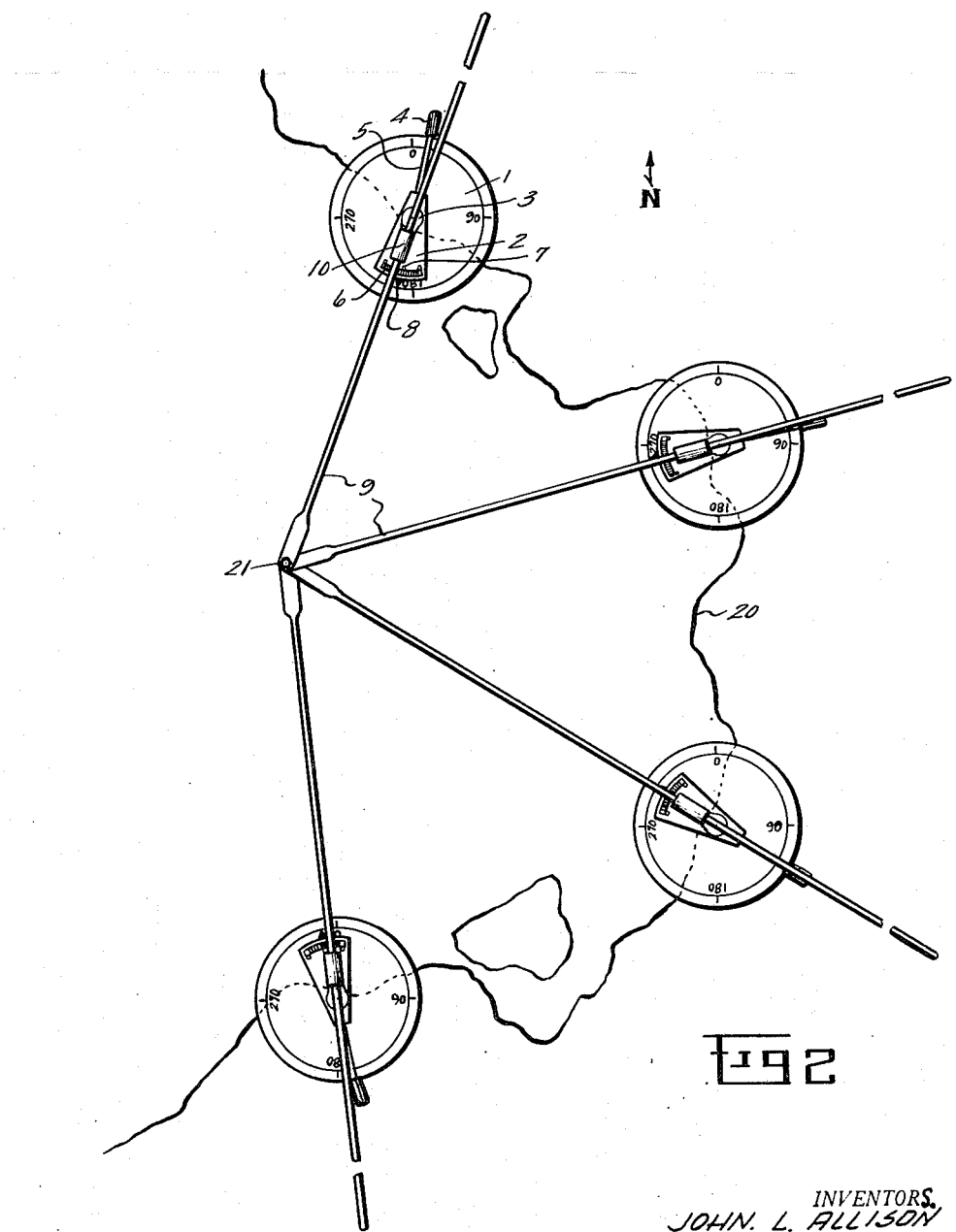

Patented Dec. 26, 1950

2,535,942

UNITED STATES PATENT OFFICE 2,535,942

ELECTRIC DIRECTION FINDING EVALUATOR

John H. Lewis and John L. Allison, New York, N. Y., assignors to the United States of America as represented by the Secretary of the Air Force Application November 18, 1948, Serial No. 60,768

10 Claims. (Cl. 33—1)

The invention described herein may be manufactured and used by or for the Government for governmental purposes without payment to us of any royalty thereon.

This invention relates to direction finding systems and particularly to means for decreasing the errors commonly present in such systems.

In a direction finding system of the type in which a plurality of fixed stations obtain bearings to an object and in which the intersection of the several bearings, when plotted on a map, gives the location of the object, there are two errors commonly encountered in the bearings obtained from each station. One of these, which may be designated "$a$" is a variable quantity and represents the angular deviation of the instrument from the mean, while the other, which may be designated "$s$" is a fixed quantity and represents the standard deviation of the instrument which may be used for security. For any direction finding system of "$n$" fixed stations the following equation may be written:

$$(a_1/s_1)^2 + (a_2/s_2)^2 + \ldots (a_n/s_n)^2 = X$$

The solution of this equation, when "$X$" is a minimum value, gives the most probable fix of the direction finder bearings. When "$X$" is any other fixed value, the solution provides a curve which is a contour of constant probability for the fix and as such bounds a minimum area of given probability.

The device described herein is designed to operate directly on a physical representation of the area containing the direction finders and the object and, in particular, can operate on a gnomonic projection of the area of operations. The following description is based on the assumption that it is to be used in conjunction with a gnomonic projection.

The device contains a number of protractors located on the gnomonic chart at points representing the direction finder station locations. Each potentiometer measures the angle "$a$" of the above equation between the reported direction finder bearing and the great circular line to an assumed fix. The protractors have provisions for correcting the distortion occuring on a gnomonic projection and for obtaining the ratio $a/s$ in the above equation for the corresponding station. The device obtains the total of the squares of these ratios and registers the total on an electric meter. The meter reading, therefore, corresponds to "$X$" in the above equation and, by manually changing the position on the chart of the assumed fix, the angles "$a$" take on various values which satisfy the equations dictated by the actual configuration of the direction finder stations. A position can be found where "$X$" is a minimum, thereby giving the most probable point, or points can be found where "$X$" has a fixed value other than minimum thereby determining a contour of fixed probability.

It is accordingly the object of this invention to provide an apparatus capable of determining the most probable fix, or else for determining the boundaries of the minimum area of any given probability containing the fix in a direction finding system of the type described.

A specific embodiment of the invention will be described in connection with the accompanying drawings in which:

Fig. 1 shows the details of a potentiometer in accordance with the invention,

Fig. 2 shows the map lay-out for a four station direction finder system employing the invention, Fig. 3 shows an apparatus for coupling the ends of the great circle extension rods of the potentiometers to a common point, and Fig. 4 shows the electrical circuit in which the potentiometers are connected.

The protractor for measuring the angle between the reported direction finder bearing and the great circle line to the assumed fix point is shown in Fig. 1. It consists of a dial 1 which is centered on a point on the map representing the location of a direction finder station. The dial may be oriented in any established way such, for example, as to read azimuth from true north, in which case 0° points to true north. A vertical pin (not shown) is mounted in the center of the dial and serves as a pivot for members 2 and 3 which may freely rotate thereabout independently of each other. The member 2 has attached thereto a handle 4 for adjusting its angular position. Means should be provided for locking member 2 after adjustment and this may be accomplished, for example, by threading the shaft 5 of handle 4 into the hub of member 2 so that by rotation of the handle pressure may be exerted against the pivot pin to lock member 2 in position. However, the member 3 should be at all times freely rotatable about the pivot pin.

The member 2 carries a potentiometer 6 insulated therefrom and having a center tap 7 which is aligned with pointer 8. The member 3 supports a rod 9 by means of a vertical extension 10, in which the rod is freely slidable, so that its axis passes directly over the center of dial 1. The member 3 also carries a contact which is insulated therefrom and engages potentiometer 6. The contact 11 is directly under the axis of rod 9 so that when this axis is directly above pointer 8 the contact 11 is opposite center tap 7. The resistance of potentiometer 6 is so distributed that the voltage between the center tap 7 and contact 11 is proportional to the square of the angle between contact 11 and center tap 7, or, in other words, the angle in the horizontal plane between the axis of rod 9 and a line through pointer 8 and the center of dial 1, which is the angle "$a$" of the above equation for the particular station.

In Fig. 2 a plotting board lay-out is shown for a direction finder system having four fixed stations located, for example, along a coastline 20 at the centers of the four protractor dials shown. Each of these protractors is identical to the one shown in Fig. 1. The four rods 9 of these protractors are brought together at a fix defining point 10 or a point of intersection 21, the assembly at which point may be as shown in Fig. 3. A marking stylus 22 may be provided for recording the movement of the point of intersection on the map.

Fig. 4 shows the electrical circuit in which the potentiometers 6 of the four protractors in Fig. 2 are connected. Operating potential at 60 cycles per second is applied to the primary of transformer 30. The secondary of this transformer has four taps which are connected to the four contacts of parallel connected switches 31, one of which is provided for each potentiometer. The movable contacts of switches 31 are connected through adjustable resistors 32 to the ends of potentiometer resistors 6, the center taps of which are grounded. Since the lower end of the secondary of transformer 30 is grounded the circuit operates to produce a voltage between the ends of resistors 6 and the grounded center tap 7 the value of which is determined by the settings of switches 31 and resistors 32. The sliding contacts 11 which are mounted on members 3 as shown in Fig. 1, are connected to one side of the primaries of transformers 33 the other sides of which are grounded. The voltages applied to these primaries are therefore determined by the positons of the contacts 11 relative to the center taps 7. In order to obtain a reading proportional to the sum of these voltages the secondaries of transformers 33 are connected in series and the resulting voltage applied to meter 34.

With the above circuit the voltage indicated by meter 34 represents the sum voltage from all four protractors and is equivalent to "X" in the equation previously given. The actual angle between the minimum point or center tap on the resistance strip 6 of each protractor and the movable finger attached to member 3 and rod 9 is equivalent to the "$a$" quantity in the equation. The "$s$" quantities in the equation are taken account of by using a voltage at the ends of resistance 6 of each protractor which is inversely proportional to the square of the standard angular deviation assigned to the particular direction finder represented by that protractor. Since the standard deviation is indicated by the value of the bearing reported by the direction finder operator and this standard deviation customarily takes on only four or five fixed values this voltage may be supplied by a tapped resistor or transformer which will provide a voltage to the ends of the resistance strip corresponding to the standard deviation associated with the bearing value reported by the direction finder operator. In Fig. 4 it is the function of switch 31 to supply this voltage.

To take account of the distortion of the gnomonic projection on which this device will probably have its major utility, for each protractor there will be a diagram or table which indicates how much compression or expansion of angular measure there is associated with the bearing reported by the direction finder operator. In the case of angle distortion being an expansion of angle, the voltage to that particular protractor should be increased, whereas, if the distortion is a compression of angle, the voltage should be decreased in direct proportion to the angular distortion. In Fig. 4 a variable resistance 32 is provided in series with the potentiometer resistance 6 of each protractor to adjust the applied voltage in accordance with the above described distortion. Since the most probable bearing will, in almost all cases, be within a few degrees of the reported bearing, and since the distortion in a gnomonic chart does not change rapidly with azimuth, the fact that the distortion is corrected for the reported bearing, rather than for the bearing associated with the most probable fix, will cause an entirely negligible error. As a second approximation, of course, the voltage variation to correct for the gnomonic projection distortion can be applied after the most probable fix has been computed, but this would seem to be an entirely unnecessary refinement.

As already pointed out the voltage between the movable contact 11 of each protractor and the center tap 7 of the resistance 6 is proportional to the square of the angle between contact 11 and tap 7, which angle is the angle "$a$" for the corresponding direction finder in the above mentioned equation. Also, as explained above, the voltage applied to the resistance 6 through switch 31 is inversely proportional to the square of the standard angular deviation of the station. Hence the voltage between the contact 11 and tap 7, and likewise the voltage induced in the secondary of transformer 33, is proportional to the ratio $(a/s)^2$ for the particular station. The reading on meter 34 is therefore proportional to the sum of the $(a/s)^2$ terms and consequently to "X" in the equation.

In order to use the above described device the following simple procedure is employed: (1) Rotate the member 2 of each protractor to agree with the bearing reported from the corresponding direction finder station. (2) Select the tap on switch 31 for each protractor to that agreeing with the standard deviation reported by the direction finder operator for that station. (3) According to the chart or table provided (which may be simply a polar coordinate curve at each protractor), make the minor adjustment of resistor 32 necessary to correct for the distortion of the gnomonic projection at the bearing reported by each direction. (4) Observing the meter which reads the sum of the voltages from all of the protractors, move the pivotal point 21 (Fig. 2), to which the rods 9 of all protractors are attached, over the operational area until the minimum reading is obtained on the meter. This point for which the meter reading is a minimum is the statistically most probable location of the object which all of the direction finders are reporting.

In order to find the boundary of the minimum area of any probability containing the object, the minimum meter reading obtained as above is referred to a table supplied with the instrument. According to (1) the desired value of the probability that the sought area contains a fix, (2) the number of direction finders, (3) their standard deviations and (4) the minimum meter reading just obtained, a new meter reading is obtained from the table for a contour associated with the minimum area of any given probability. The pivotal point 21 is then moved away from the most probable fix point in any direction until this new meter reading is attained. This point is a point on the desired contour. By moving consecutively in several directions away from the most probable fix point, a number of points may be located and these fall upon, and thus identify, the desired contour line. This is the boundary of the minimum area of given probability containing the fix. The details of and the compilation of the above described table are not a part of the invention and hence no further discussion thereof is necessary.

We claim as our invention:

1. An evaluator for use with a direction finding system of the type in which each of a plurality of fixed stations obtains a bearing to an object, said evaluator comprising means providing a map of the operational area of said system, a plurality of protractors corresponding in number to the number of fixed stations and each located on said map with its center coinciding with a point representing the location of a fixed station, means providing an assumed fix point movable over said operational area, means associated with each protractor for producing a voltage proportional to the square of the angular difference between the bearing reported by the corresponding fixed station and the bearing from the point representing said station on said map and said assumed fix point, and means for producing an indication proportional to the sum of said voltages for said plurality of protractors.

2. Apparatus as claimed in claim 1 in which additional means are associated with each voltage producing means for adjusting the amplitude of the voltage produced thereby in accordance with an inverse function of the square of the standard angular deviation of the corresponding fixed station.

3. Apparatus as claimed in claim 2 in which further means are associated with each voltage producing means for adjusting the amplitude of the voltage produced thereby to compensate for the distortion in the map projection used.

4. An evaluator for use with a direction finder system of the type in which a plurality of fixed direction finder stations each determine the bearing to an object and in which the intersection of said bearings, when plotted on a projection of the operational area of the system, indicates the location of the object, said evaluator comprising means forming a plane projection of the operational area, a plurality of protractors corresponding in number to the number of direction finder stations each positioned on said projection with its center coinciding with a point on said projection marking the location of a direction finder station, a first and a second direction indicating means for each protractor each pivoted at the center of the protractor and independently rotatable thereabout, means for setting said first direction indicating means in accordance with the bearing to said object reported by the corresponding direction finder station, means movable over the operational area of said projection for defining a fix point, means associated with each of said second direction indicating means and with said fix point defining means for causing said second direction indicating means to always point toward said fix point, means associated with each of said protractors for producing a voltage proportional to the square of the angle between the two direction indicating means thereof, and means for producing an indication proportional to the sum of said voltages.

5. Apparatus as claimed in claim 4 in which means are provided to adjust the amplitude of the voltage produced at each protractor in accordance with an inverse function of the square of the standard angular deviation of the corresponding direction finder station.

6. Apparatus as claimed in claim 5 in which additional means are provided in connection with the voltage producing means associated with each protractor to further adjust the amplitude of the voltage produced thereat in accordance with the angular distortion of said projection referred to the center of the protractor.

7. Apparatus as claimed in claim 4 in which each of said voltage producing means comprises a center tapped potentiometer resistance mounted on the first direction indicating means of the associated protractor, a sliding contact cooperating with said potentiometer resistance and mounted on the second direction indicating means of the associated protractor so that when said first and second direction indicating means point in the same direction the sliding contact is opposite the center tap of said potentiometer resistance, means for applying an alternating operating potential between the ends of said potentiometer resistance and said center tap, and a transformer having its primary winding connected between said sliding contact and said center tap, and in which said means for producing an indication proportional to the sum of said voltages comprises an electric meter and means connecting the secondary windings of said transformers in series across said meter.

8. Apparatus as claimed in claim 7 in which the potentiometer resistance in each of said voltage producing means has a resistance taper such that the resistance between said center tap and said sliding contact is proportional to the square of the angle between said first and second direction indicating means.

9. Apparatus as claimed in claim 8 in which means are provided in connection with the operating potential applying means in each voltage producing means to adjust the operating potential applied to the potentiometer resistance in said voltage producing means to any of a plurality of predetermined values each of said values being inversely related to the square of a standard angular deviation for the corresponding direction finder station.

10. Apparatus as claimed in claim 9 in which additional means are provided in connection with the operating potential applying means in each voltage producing means to further adjust the amplitude of the operating potential applied to the potentiometer resistance in said voltage producing means in accordance with the angular distortion of said projection referred to the center of the protractor.

JOHN H. LEWIS.
JOHN L. ALLISON.

REFERENCES CITED

The following references are of record in the file of this patent:

UNITED STATES PATENTS

| Number | Name | Date |
| --- | --- | --- |
| 483,999 | Fiske | Oct. 11, 1882 |
| 1,437,400 | Conners | Dec. 5, 1922 |
| 2,063,534 | Wallace | Dec. 8, 1936 |
| 2,244,369 | Martin | June 3, 1941 |